United States Patent [19]

McLoughlin

[11] 3,786,869

[45] Jan. 22, 1974

[54] NOZZLE PRESSURE CONTROL SYSTEM

[76] Inventor: John McLoughlin, 92 Mobrey Ln., Smithtown, N.Y. 11787

[22] Filed: Apr. 27, 1972

[21] Appl. No.: 248,012

[52] U.S. Cl.................... 169/24, 239/570, 417/34,
[51] Int. Cl............................................ A62c 27/00
[58] Field of Search..................... 417/34; 251/131 169/24, 239/570;172

[56] References Cited
UNITED STATES PATENTS

| | | | |
|---|---|---|---|
| 3,544,235 | 12/1970 | Smith................................ | 417/34 X |
| 3,493,053 | 2/1970 | Triplett............................... | 169/24 |
| 3,613,070 | 10/1971 | Jones et al....................... | 251/131 X |
| 3,154,670 | 10/1964 | Gossel............................ | 251/131 X |
| 3,322,350 | 5/1967 | Heinicke et al..................... | 239/172 |

Primary Examiner—M. Henson Wood, Jr.
Assistant Examiner—John J. Love
Attorney, Agent, or Firm—James P. Malone

[57] ABSTRACT

Hose nozzle pressure control means for a fire engine pumper of the type having a pump driven by a truck engine comprising, engine governor means connected to and responsive to the pump output pressure and engine throttle means to regulate engine speed to maintain pump output pressure, a motorized valve connected between said pump and said hose, and means to control said valve from said nozzle location. The valve control means comprises a transmitter located at said nozzle, a receiver and control means connected to said receiver and responsive to said transmitter to control said valve. The transmitter is connected to said receiver means by wire or by radio.

1 Claim, 6 Drawing Figures

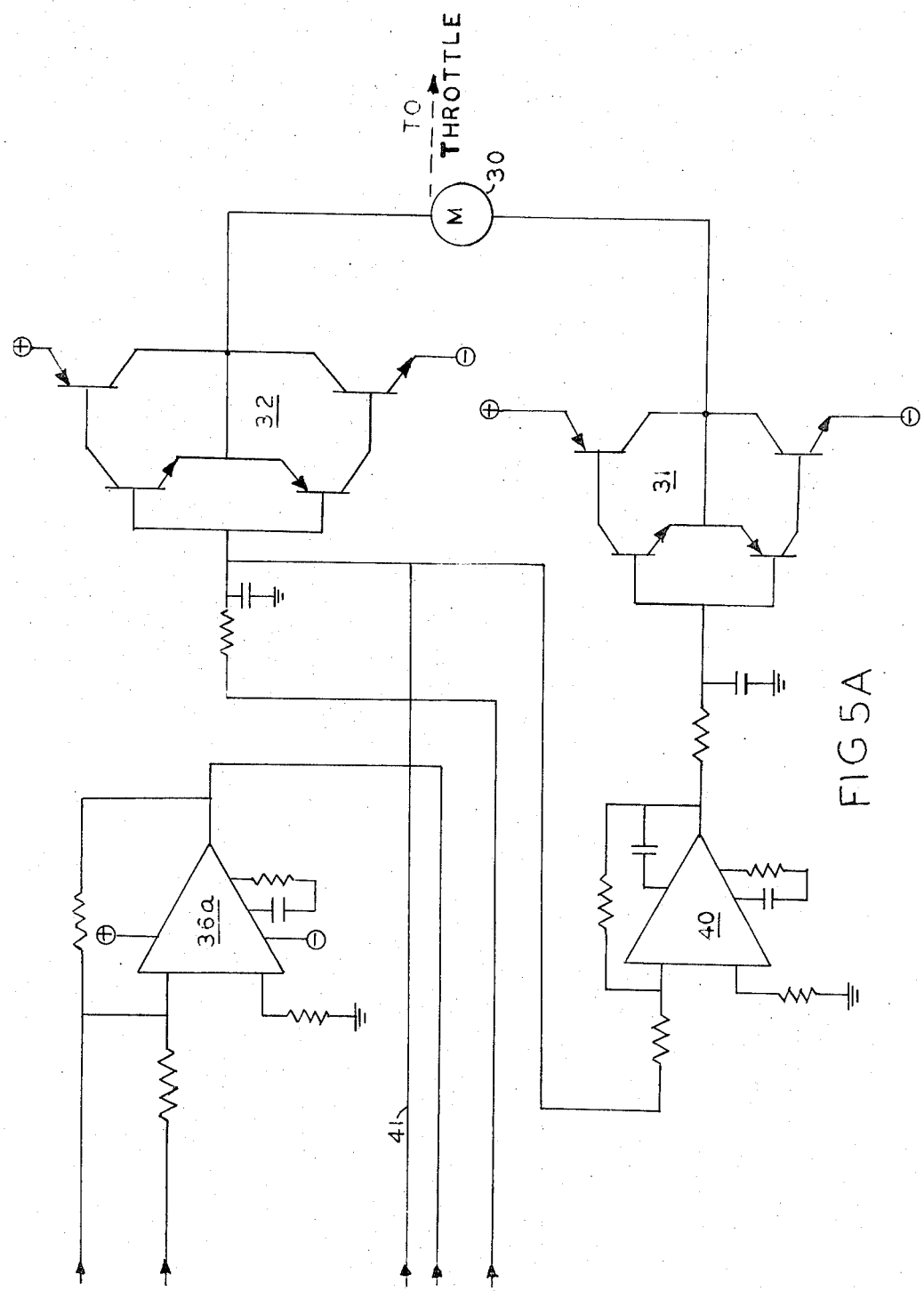

NOZZLE PRESSURE CONTROL SYSTEM

This invention relates to nozzle pressure control means for fire hoses and more particularly the means to control the nozzle pressure by the operator who is operating the nozzle.

In the normal situation the pump pressure is supplied by the large pump on the fire truck which pumps the water through the length of hose, for instance, one hundred feet long. The fireman who is operating the nozzle has no direct control over the pressure.

The present invention provides the nozzle operator, who may be one hundred feet or more away from the truck, with means for directly controlling the pressure. This is advantageous since it gives him a direct control without relying with any verbal communication with the fire turck personnel.

Means are also provided on the fire truck to maintain the pump output pressure automatically by means of a throttle control on the engine.

More specifically, the nozzle control of the present invention comprises a small control box which may be held by the nozzle operator. The box contains a dial whereby he can increase or decrease the pressure. This control box contains a digital transmitter which is connected to a receiver and then a decoder on the truck by a direct wire or by radio control. The decoder operates a driver amplifier which controls a motorized valve in the hose. Therefore, by turning the control dial up the pressure will be increased.

Accordingly,, a principal object of the invention is to provide new and improved nozzle control means for fire fighting purposes.

Another object of the invention is to provide new and improved means for controlling pump output pressure by controlling the engine speed automatically.

Another object of the invention is to provide new and improved means comprising a control box, which is operated by the nozzle operator without any necessity for verbal communications with anyone on the fire truck.

Another object of the invention is to provide new and improved hose nozzle pressure control means for a fire engine pumper of the type having a motor driven pumper and a hose connected to a nozzle, a motorized valve connected between said pump and said hose, and means to control said valve from said nozzle location.

These and other objects of the invention will be apparent from the following specification and drawings, of which:

FIG. 5 and 5A is a schematic diagram of the governor circuits.

Figure 2:
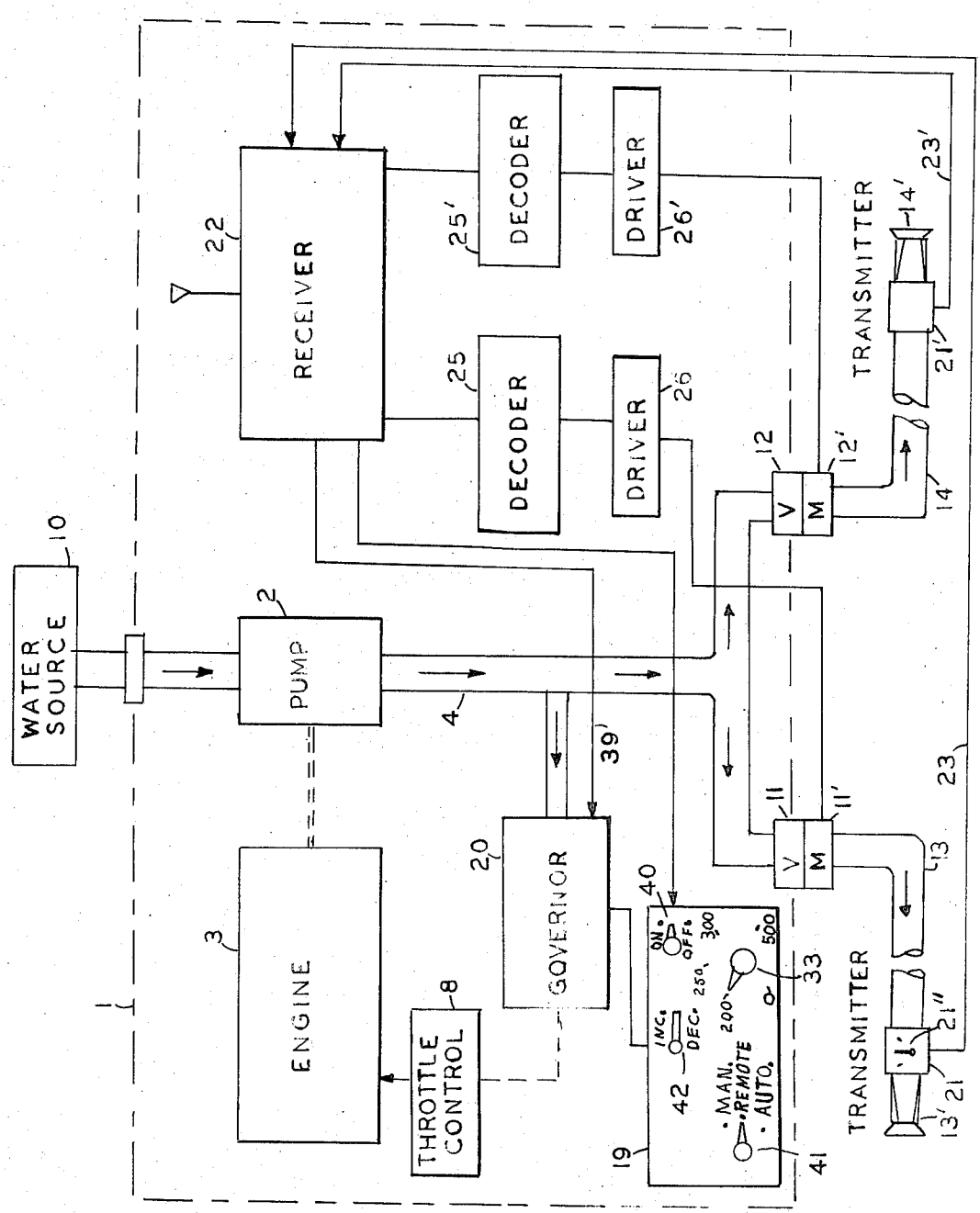
FIG. 2 is a schematic block diagram of the system.

The nozzle pressure control system consists of three major subsystems, see FIG. 2. The first subsystem is an electronic pump pressure regulator 20, the purpose of which is to maintain a constant pump output pressure as the incoming pressure of the pump flow rate varies. The pump pressure regulator has already been designed and a prototype has been successfully tested. It will maintain the output pressure within 10 PSI of the selected pressure and will return to within 5 pounds of the selected within 5 seconds of a 50 percent change of incoming pressure or a 100 percent change in flow rate.

The second portion of this system consists of the following modules:

1. A radio receiver 22.
2. A series of digital decoders 25, power pulse generators 26 and motorized quarter turn ball valves 11, 12.

The receiver will be designed to have sensitivity to receive a signal from any nozzle transmitter within a half mile radius. This signal it will receive will be RF pulses.

The decoders will receive digital logic signals from the RF receiver. The decoding will be done on the basis of the number of pulses received, the length of the pulses and the interval between them. When the decoder recognizes the signal being received as its activation signal, it will generate power pulses of the proper polarity to drive the motorized quarter turn ball valve 11. Since there will be a requirement for a large amount of different sets of encoders and decoders, they will be designed to be built in matching sets of plug-in modules.

The third portion of the system is a nozzle mounted transmitter. This will be a completely encapsulated battery powered transmitter 21, with two protected and covered switches (one for open and one for close). This package will be designed to be mounted directly on a small extension of the nozzle handle. It will be in line with the nozzle so as not to cause any difficulties for the nozzle operator. It will have two encoders that will key the RF generator in the proper sequence. The encoders will gate the transmitters. The output of the encoder will be a binary word of four bits and this digital word will be repeated approximately every 100 milliseconds. There will be a slight variation in the 100 milliseconds time variable for the nozzles so that one nozzle transmitter cannot mask another for more than 2 cycles.

It will be possible to add audio capability for the nozzle man. This will enable the nozzle man to be in constant contact with his commanding officers at the scene.

Figure 1:
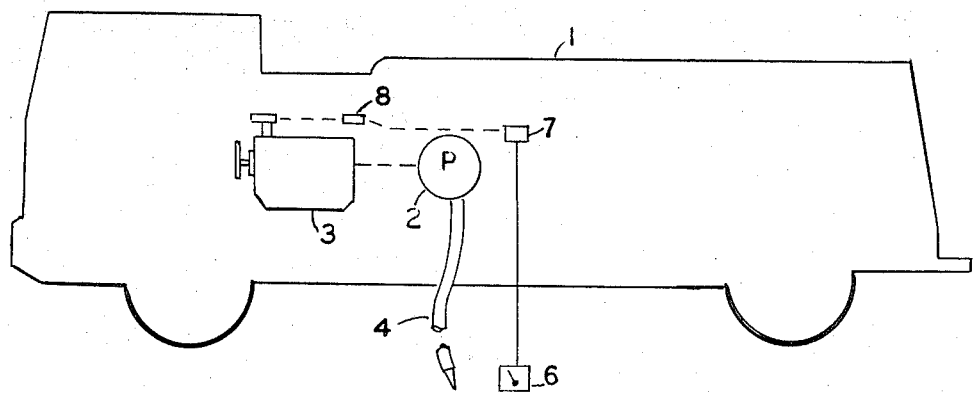
FIG. 1 is a side view of a fire truck illustrating the major components of the system.
Figure 1:
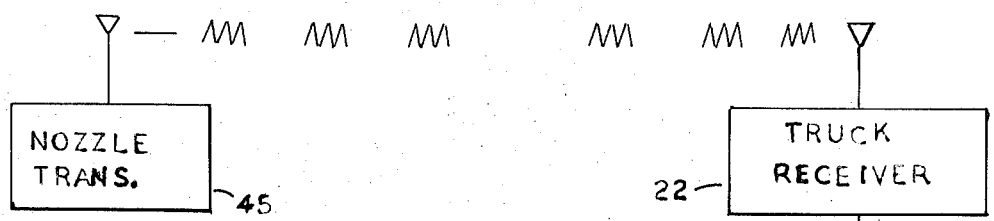

More specifically referring to the figures, FIG. 1 shows a fire truck pumper 1, having a pump 2, which is operated by the truck engine 3, the output of the pump is connected to a hose 4, on the other end of which is a nozzle 5. All of the elements so far described are conventional.

The present invention provides a remote control 6, which is located on the nozzle and which is operated by the nozzle operator. The remote control 6, is connected to a panel control 7 in the fire truck which is adapted to control the pump output pressure by means of a carburetor control or throttle 8, which controls the engine 3 speed.

FIG. 2 shows a schematic block diagram of the nozzle pressure control system. The truck engine 3 is mechanically connected to operate the pump 2. The pump, for instance, is connected to a water hydrant 10 and the pump output is connected to a pair of valves 11, 12, which are operated by motors 11' and 12'. The outputs of the valves are connected to the long hoses, 13 and 14, at the end of which are the nozzles 13' and 14'.

The pump output pressure is maintained by means of the governor 20 which measures the pump output pressure and operates the throttle control 8,. which controls the speed of the engine, 3. Therefore, the pump output pressure is maintained constantly regardless of the variation of the input pressure, or flow.

The means for controlling the nozzle pressure and governor 20 by the nozzle operator, who is remote from the truck, comprises a digital transmitter 21 which is connected to the receiver 22 by direct wire 23. Alternatively, the transmitter 21 could be a radio transmitter and the receiver 22 a radio receiver. This would eliminate the necessity for a direct wire connection. The other nozzle 14' has a similar digital transmitter 21' which is connected to the receiver by means of the wire 23'. The transmitter 21 is a digital transmitter 21 which may be a conventional control or other device which generates an electrical signal controlled by the control knob 21''. The pulses are fed to the receiver 22 and then to the decoder 25' which controls the amplifier driver 26, which in turn controls the valve motor 11'. Thereafter by changing the number of pulses, the nozzle operator is able to control the valve 11 opening. A similar control for the other valve 12 is provided by the remote transmitter 21', decoder 25' and amplifier driver 26'.

Figure 3:
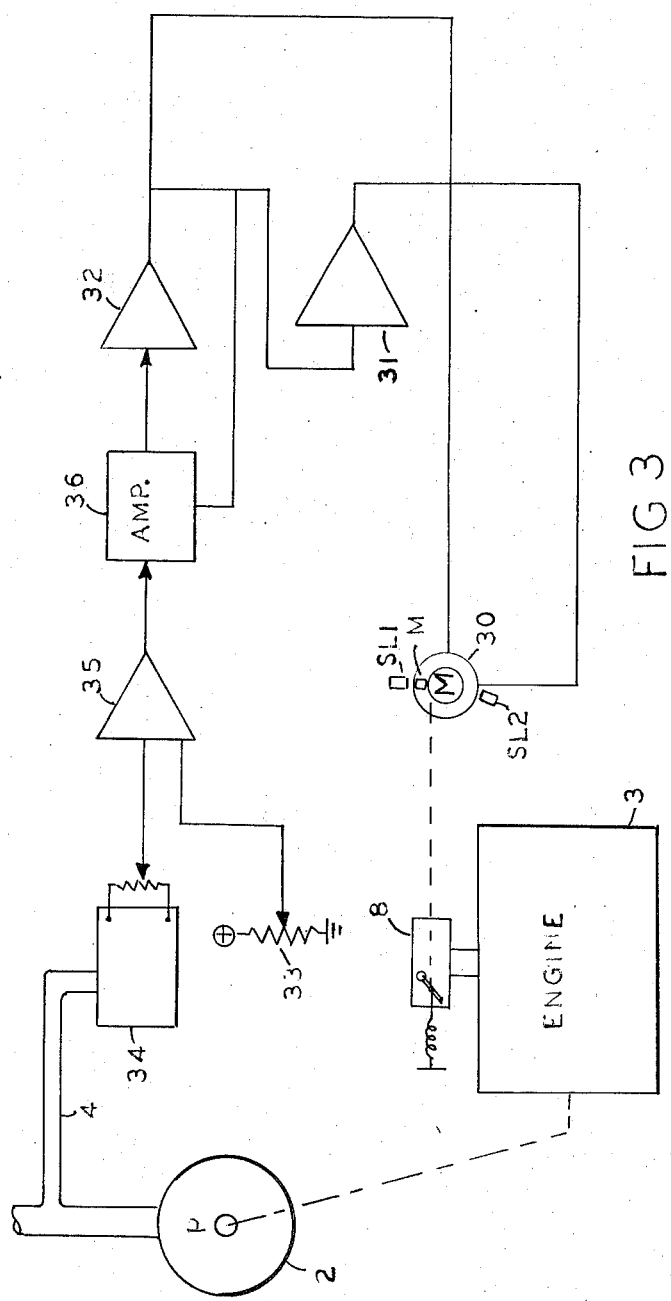
FIG. 3 is a schematic diagram of the governor control system.

Referring to FIG. 3, the governor includes a DC motor 30 which is driven by two output amplifiers 31 and 32 in the control system. Motor speed and direction are controlled by the voltage of these amplifiers. The input to these amplifiers is controlled by a difference between a selected pressure from selector 33 (represented by a voltage) and the actual output pressure as determined by a transducer 34.

The pressure transducer 34 can be any of the types available on the commercial market. These include a Bourdon type driven potentiometer, a semi-conductor transducer or a strain gauge type transducer. The required pressure is set by a panel potentiometer 33 and this voltage is set into a differential amplifier 35, and is compared with the transducer 34 voltage. If the voltages are not equal, the amplifier 35 will have an output polarized, the amplitude of which is proportional to the difference between the selected pressure and actual pressure. This voltage, when amplified by amplifier 36 and fed to power amplifier 32 and inverting power amplifier 31 and fed to the DC motor 30 will cause it to rotate and turn the carburetor/fuel rack 8 position so that speed of the gasoline or diesel engines is changed. The speed of the electric motor 30 is nonlinearly proportional to the error. At small errors, i.e., in the range of 10 psi, there will be motor movement. Due to a nonlineal feed-back design, the motor does not operate at full speed until an error of 50 psi is reached. By the use of the nonlineal feed-back circuit, the system will be stable. In FIG. 3, the motor 30 is connected to the throttle arm 8, by means of a cable linkage. The motor has limit switch means comprising, a magnet M mounted on the fly wheel or other rotating part of the motor. The magnet operates magnetic switches SL1. and SL2. to limit the travel of the motor.

The panel control 19 as shown on FIG. 2, has very few controls on it. There is one switch 40 for on/off and, a multi-position switch 41, for selecting manual or automatic. In the manual portion, the pressure can be increased or decreased by a spring-loaded two position electrical switch 42. When the unit is in the automatic position, the governor 20 itself is the sole functioning unit. When the unit is in the remote position, the complete unit is in operation, i.e., the receivers, the digital decoders and the motorized quarter turn ball valves.

We also have an option to have a solid wire control back to the governor for just controlling the governor output but not controlling the motorized quarter turn ball valves.

Figure 4:
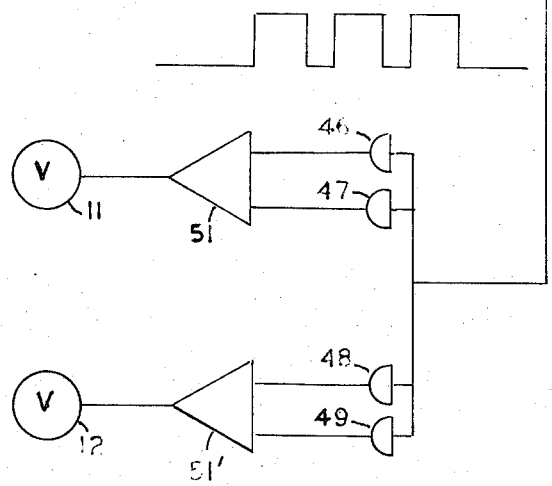
FIG. 4 is a schematic diagram of the remote transmitter decoder control system.

Referring to FIG. 4, the digital radio transmitter 45, located at a nozzle, is a standard transmitter operating on one of the allocated fire department frequencies of relatively low power. Its output is bursts of digital signals as shown. The conventional transmitter will be keyed by a digital word generator whose output word is unique to that transmitter. Alternatively, a tone generator may also be used.

The decoders 46, 47, 48, and 49 receive all digital signals received by the remote controllers receivers 50. These programmed digital decoders are commercially available and they only have an output when they receive a serial data word that is identical to their programmed digital word. For each decoder, there will be an identical digital transmitter. The output of the transmitter can only be decoded by its own decoder. Each decoder amplifier 51, 51' will have three outputs; normally off, a plus voltage or negative voltage. They will drive the motorized quarter turn ball valves in accordance with the polarity signal given to them by the transmitter.

There may be a direct connection between the radio receiver and governor, so that the nozzle operator can control the governor by remote control. This connection may be made directly from the nozzle to the governor. The governor's only function is to maintain a programmed water pressure when there are a number of hose lines operating off of one piece of apparatus. The opening or closing of one will effect the output pressure of the pump and hence require the other nozzle operators to reset their nozzle pressures. If, however, there is a governor installed on the truck, opening or closing of one nozzle will have no effect on the other nozzles because the governor will keep the pump pressure constant. We may also have a master unit so that one of the nozzlemen can have control over the governor to make adjustments on the output pressure of the pumper when he is at a nozzle position.

Figure 5:
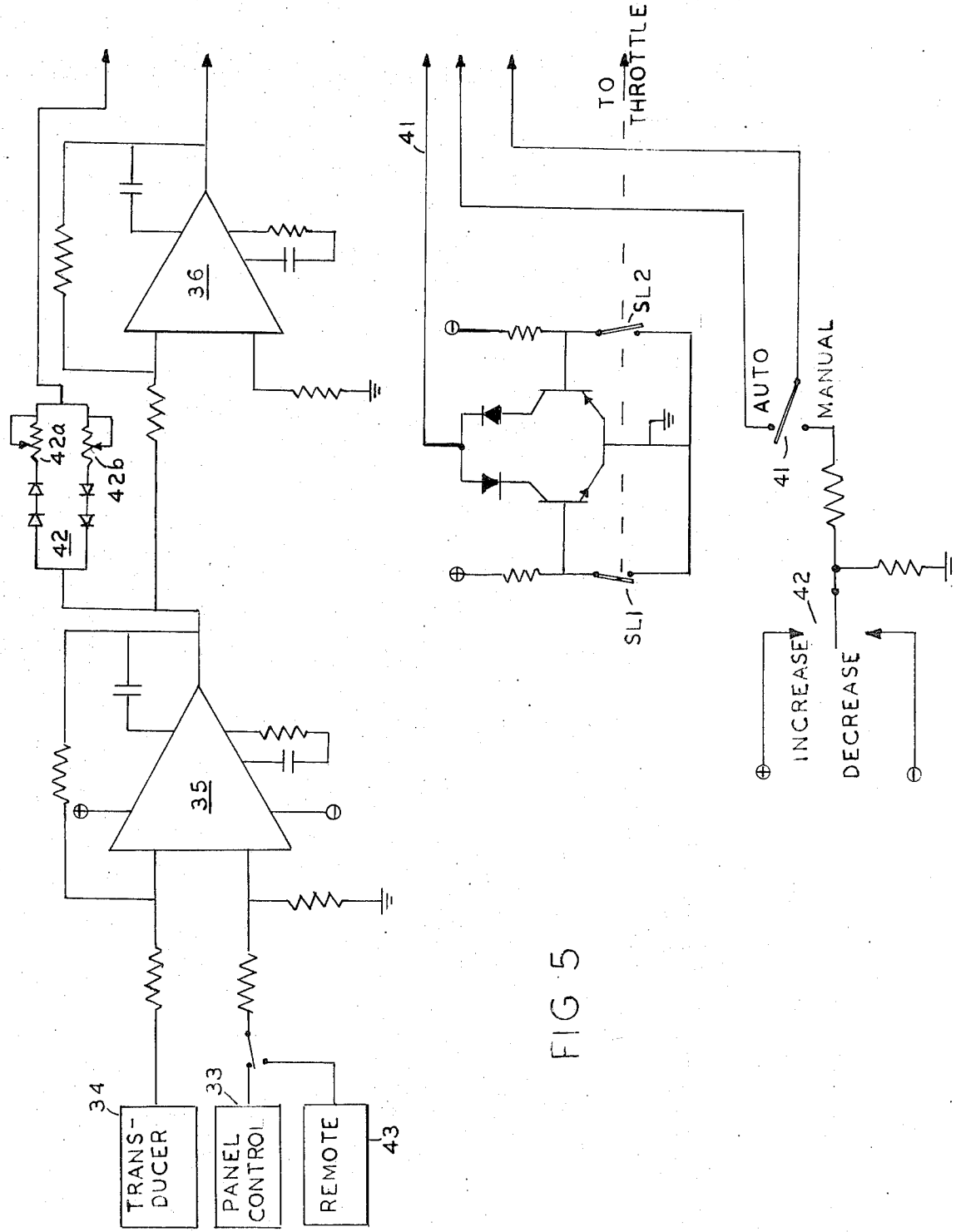

FIGS. 5 and 5A shows a detail schematic circuit diagram of the governor circuits. The signals from pressure transducer 34 and pressure selector 33 are connected to differential amplifier 35. The output of amplifier 35 is connected to amplifiers 36 and 36A.

In the automatic position of switch 41, the output of amplifier 36A is connected to amplifier 32 and through inverting amplifier 40 to amplifier 31. The amplifiers 31 and 32 are connected in push-pull to drive the motor 30.

When the switch 41 is in manual position, then the switch 42 may be operated to manually increase or decrease the pressure.

Limit switches SL1. and SL2. are mounted on the motor to limit the travel of the motor. Both of these switches are normally closed and when one of them is opened by overtravel of the motor, a circuit is completed which grounds out the output to motor 30 through the connecting line 41. The purpose of the circuit 42 is to provide a non-linear motor-speed characteristic with respect to error to provide motor stability. The potentionmeters 42a and 42b are bias adjustments to adjust the upper and lower motor-speed characteristic curve.

A remote control 43 located at the nozzle may also be used to control the governor. All of the components of the circuits of FIGS. 5 and 5A are conventional.

I claim:

1. Hose nozzle pressure control means for a fire engine pumper of the type having a pump driven by a truck engine, comprising, engine governor means connected to and responsive to the pump output pressure and engine throttle means to regulate engine speed to maintain pump output pressure, comprising an electric motor connected to the engine throttle,, electric amplifier means connected to the input of said motor, first input potentiometer means connected to said amplifier simulating a selected pump pressure and second input transducer means connected to said amplifier transmitting actual pump pressure.

* * * * *